Figure 2:
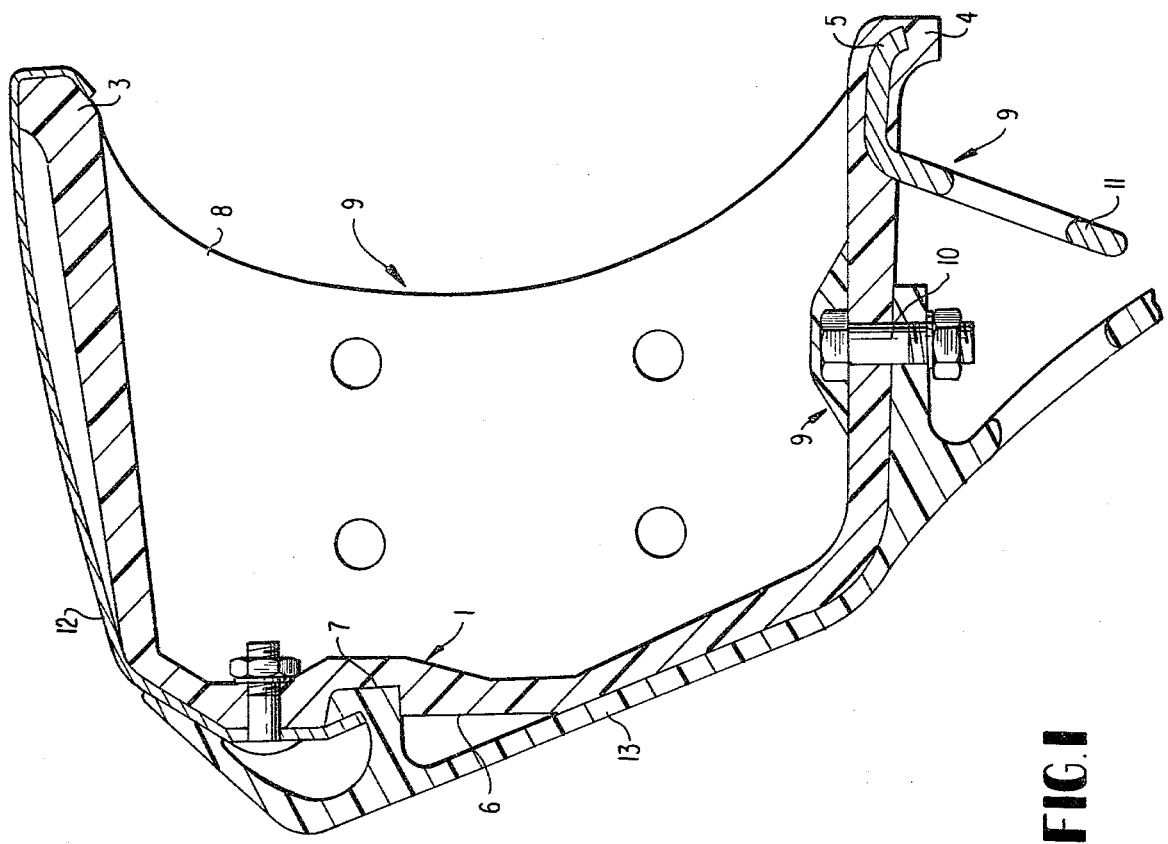

United States Patent [19]
Huber et al.

[11] 4,208,069
[45] Jun. 17, 1980

[54] BUMPER-SUPPORT BODY CONSISTING OF GLASS-FIBER-REINFORCED SYNTHETIC PLASTIC MATERIAL

[75] Inventors: Guntram Huber, Aidlingen; Hubert Hutai, Grafenau; Wolfgang Klie, Korntal; Wolfgang Fischer, Echterdingen, all of Fed. Rep. of Germany

[73] Assignee: Daimler-Benz Aktiengesellschaft, Stuttgart, Fed. Rep. of Germany

[21] Appl. No.: 841,930

[22] Filed: Oct. 13, 1977

[30] Foreign Application Priority Data

Oct. 30, 1976 [DE] Fed. Rep. of Germany ....... 2650096

[51] Int. Cl.² .................. B60R 19/00; B60R 21/14
[52] U.S. Cl. .................. 293/102; 293/120; 293/155
[58] Field of Search .......... 293/69 R, 70, 98, 60, 293/71 R, 120, 121, 155, 102; 114/219; 405/211, 212, 214, 215

[56] References Cited

U.S. PATENT DOCUMENTS

| | | | |
|---|---|---|---|
| 3,774,952 | 11/1973 | Zorn | 293/69 R |
| 3,852,150 | 12/1974 | Weller | 293/70 |
| 3,883,168 | 5/1975 | Goupy | 293/98 |
| 4,066,286 | 1/1978 | Haberle | 293/98 |

FOREIGN PATENT DOCUMENTS

2460859  6/1976  Fed. Rep. of Germany ........ 293/69 R

*Primary Examiner*—Trygve M. Blix
*Assistant Examiner*—D. W. Keen
*Attorney, Agent, or Firm*—Craig & Antonelli

[57] ABSTRACT

A bumper support member for motor vehicles which consists of glass-fiber-reinforced synthetic resinous material, is profiled approximately U-shaped and is additionally strengthened by giving the support member a wall thickness that is essentially matched over its length to a bending moment curve calculated from the critical load cases and by providing the support member with fastening elements that are formed-on and/or formed-in for mounting and support thereon of parts such as shock absorbers and towing eyes or hooks.

9 Claims, 2 Drawing Figures

U.S. Patent

Jun. 17, 1980

4,208,069

BUMPER-SUPPORT BODY CONSISTING OF GLASS-FIBER-REINFORCED SYNTHETIC PLASTIC MATERIAL

The present invention relates to a bumper support member consisting of glass-fiber-reinforced synthetic resinous material which is profiled approximately U-shaped and is additionally strengthened by aimed-at measures such as material accumulation and special profiling within main tensional zones and/or by embedded reinforcements.

Such a support body which is disclosed, for example, in the German Offenlegungsschrift No. 2,411,794 satisfies high requirements and can be manufactured in a simple manner. A decorative appearance can easily be attained by its coating or by the application of surface-finished coverings. However, the known favorable weight of the support member suffers by reason of the reinforcements necessary for the strengthening and rigidification. This is true even more so if, for example, for purposes of strengthening, reinforcements of steel are used. Furthermore, it is difficult to connect support members of the described type securely and permanently with other supporting parts without requiring costly assembly operations.

It is the aim of the present invention to reduce the support body weight while maintaining as far-reachingly as possible the strength values and to so construct the support member that it can be mounted in a simple manner at the vehicle as prefabricated structural elements.

The underlying problems are solved with a bumper support member by the combination according to the present invention of the following features:

(a) The support member has a wall thickness over its length matched to the curve of the bending moments calculated from the critical load cases; and (b) The support member is provided with formed-on and/or formed-in fastening elements for the mounting and support of attachment parts such as shock absorbers and towing eyes, lugs, hooks or the like.

A favorable distribution and introduction of the forces can be achieved if the fastening elements are connected with the reinforcements.

Accordingly, it is an object of the present invention to provide a bumper support member consisting of glass-fiber-reinforced synthetic plastic material which avoids by simple means the aforementioned shortcomings and drawbacks encountered in the prior art.

Another object of the present invention resides in a bumper support member of the type described above which permits a reduction of the weight without impairing the strength and rigidity thereof.

A further object of the present invention resides in a glass-fiber-reinforced bumper support structure which can be rigidly and permanently connected with support parts of the body without requiring complicated and costly installation operations.

Still a further object of the present invention resides in a bumper support member of the type described above which permits a reduction of the support body weight while maintaining the strength factors thereof.

Another object of the present invention resides in a bumper support structure which permits the mounting thereon of other structural elements in a simple manner.

A further object of the present invention resides in a bumper support member essentially consisting of glass-fiber-reinforced synthetic resinous material which permits the attainment of a favorable introduction and distribution of the forces.

Figure 1:
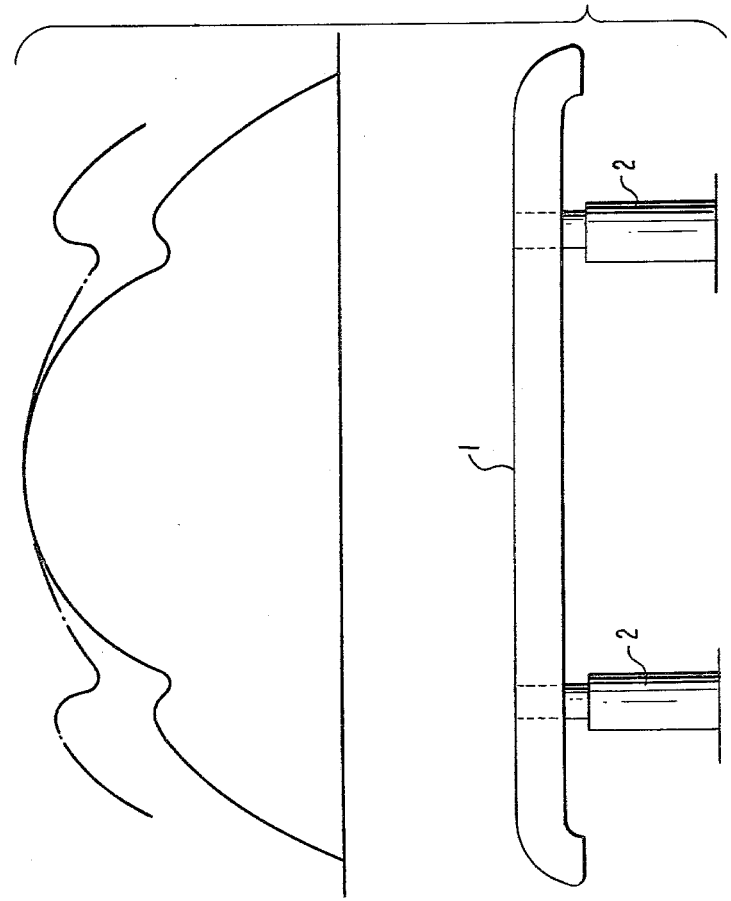

These and other objects, features and advantages of the present invention will become more apparent from the following description when taken in connection with the accompanying drawing which shows, for purposes of illustration only, one embodiment in accordance with the present invention, and wherein:

FIG. 1 is a schematic view illustrating, in principle, a motor vehicle bumper in accordance with the present invention, the curve of bending moments thereof and the average bumper wall thickness matched thereto; and FIG. 2 is a cross-sectional view through a support member in accordance with the present invention provided with covering parts.

Referring now to the drawing wherein like reference numerals are used throughout the two views to designate like parts, a bumper support member 1 is illustrated in FIG. 1, which is supported at a motor vehicle body (not shown) by way of schematically indicated shock absorbers 2; the stressing for such a bumper support member 1 is not constant over the length thereof when subjected to different loads.

The full line in FIG. 1 represents the qualitative curve of the maximum bending moments valid for all critical load cases over the bumper length.

The resistance moment of the cross section against bending and therewith the cross-sectional area can be matched to the bending moment curve (dash and dotted curve).

The support member 1 is thereby so constructed that with different load cases, the material is stressed as uniformly as possible over its length. This results in a favorable material utilization and therewith in a weight-saving.

The support member generally designated by reference numeral 1 (FIG. 2) which consists of a glass-fiber-reinforced synthetic resinous material of any known type and which is profiled approximately U-shaped, is strengthened by additional measures. Thus, it includes—as shown in FIG. 2—within its main tensional zones which are located at the free ends of the upper leg 3 and of the lower leg 4, material accumulations and a special profiling. Furthermore, it is possible to strengthen these highly stressed zones by applied or embedded reinforcements. The latter may consist, for example, of fibers of glass or carbon. However, it may also be advantageous to embed one or several metal inserts 5.

Furthermore, also the front surface 6 of the support member 1 may be reinforced, for which purpose, for example, raised webs or profiled channels 7 can be used. It is additionally possible by ribs 8 in the inner area of the support member 1 to protect the legs 3 and 4 against bending which would tend to open the approximately U-shaped profile. These ribs 8 may additionally function as formed-on fastening elements generally designated by reference numeral 9 which may serve, for example, for the mounting and support of shock absorbers (not shown). Other fastening elements 9, such as, for example, bolts 10 and towing eyes or lugs 11 which may be a part of the metal insert 5, may also be formed-on or formed-in so that a prefabricated structural part results which can be provided on its side, which can be seen from the outside, with an upper shield 12 and with a lower synthetic resinous covering 13.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a bumper member for motor vehicles of the type having an approximately U-shape cross-section, the improvement wherein the average wall thickness of the bumper member varies along its length in approximate correspondence with a curve of the bending moments calculated for the critical load cases over the length of the bumper, areas of greatest average wall thickness corresponding to areas of greatest loading, for reducing the weight of the bumper by minimizing the amount of material required and for producing substantially uniform stressing of the bumper member under loading conditions, wherein said bumper member is formed of glass-fiber reinforced synthetic plastic material, characterized in that fastening means are formed-in as part thereof, in that parts attached thereto include shock absorbers and parts used in towing the motor vehicle, said bumper member further comprising imbedded reinforcement means and characterized in that the fastening means are integrally connected with the reinforcing means.

2. A bumper member according to claim 1, characterized by further reinforcing means being provided for additionally strengthening the bumper member within its main tensional zones.

3. A bumper member according to claim 2, characterized in that said further reinforcing means include at least one of material accumulation and special profile means.

4. A bumper member according to claim 3, characterized in that the support member is strengthened by embedded reinforcing means.

5. In a bumper member for motor vehicles of the type having an approximately U-shape cross-section, the improvement wherein the average wall thickness of the bumper member varies along its length in approximate correspondence with a curve of the bending moments calculated for the critical load cases over the length of the bumper, areas of greatest average wall thickness corresponding to areas of greatest loading, for reducing the weight of the bumper by minimizing the amount of material required and for producing substantially uniform stressing of the bumper member under loading conditions, wherein said bumper member is formed of glass-fiber reinforced synthetic plastic material, characterized in that the bumper member is additionally strengthened by reinforcing means being embedded therein at free ends of legs of the U-shaped cross-section of the bumper, a portion of said embedded reinforcing means being exposed and shaped for use as a towing hook.

6. A bumper member according to claim 5, characterized in that the fastening means are connected with the reinforcing means.

7. A bumper member according to claim 6, characterized by further reinforcing means being provided for additionally strengthening the bumper member within its main tensional zones.

8. A bumper member according to claim 7, characterized in that said further reinforcing means include at least one of material accumulation and special profile means.

9. In a bumper member for motor vehicles of the type having an approximately U-shape cross-section, the improvement wherein the average wall thickness of the bumper member varies along its length in approximate correspondence with a curve of the bending moments calculated for the critical load cases over the length of the bumper, areas of greatest average wall thickness corresponding to areas of greatest loading, for reducing the weight of a bumper by minimizing the amount of material required and for producing substantially uniform stressing of the bumper member under loading conditions, wherein said areas of greatest average wall thickness are formed adjacent areas at which said bumper member is connected to means for attaching said bumper member to a vehicle frame and in approximately the center of said bumper.

* * * * *